United States Patent
Park et al.

(10) Patent No.: US 7,472,267 B2
(45) Date of Patent: Dec. 30, 2008

(54) CONVERTIBLE COMPUTER WITH SELECTIVE ACTIVATION OF INPUT DEVICES BASED ON A TABLET OR NOTEBOOK MODE

(75) Inventors: Jun Hyung Park, Anyang-si (KR); Jong Won Kim, Suwon-si (KR); Jeong Hun Kim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/598,777

(22) Filed: Nov. 14, 2006

(65) Prior Publication Data

US 2007/0061564 A1 Mar. 15, 2007

Related U.S. Application Data

(62) Division of application No. 10/812,905, filed on Mar. 31, 2004.

(30) Foreign Application Priority Data

| Aug. 11, 2003 | (KR) | ................................ 2003-55520 |
| Sep. 3, 2003 | (KR) | ................................ 2003-61548 |
| Sep. 3, 2003 | (KR) | ................................ 2003-61549 |
| Sep. 9, 2003 | (KR) | ................................ 2003-63107 |

(51) Int. Cl.
*G06F 9/00* (2006.01)
*G06F 15/177* (2006.01)
*G06F 1/24* (2006.01)

(52) U.S. Cl. ................................ 713/100; 713/1; 713/2
(58) Field of Classification Search ...................... 713/1, 713/2, 100
See application file for complete search history.

(56) References Cited

U.S. PATENT DOCUMENTS

| 5,200,913 A | 4/1993 | Hawkins et al. |
| 5,375,076 A | 12/1994 | Goodrich et al. |

(Continued)

FOREIGN PATENT DOCUMENTS

WO   WO 01/84729   11/2001

OTHER PUBLICATIONS

European Search Report dated Jun. 6, 2007.

(Continued)

*Primary Examiner*—Thomas Lee
*Assistant Examiner*—Ji H Bae
(74) *Attorney, Agent, or Firm*—KED & Associates, LLP

(57) ABSTRACT

A convertible computer is equipped with a notebook computer function and a tablet computer function. When a system power supply is turned on, a functionality or physical configuration such as rotation state of a display module can be detected, and an environment can be controlled such as an operating system (OS) for a tablet computer or notebook computer is selectively booted. Input signals of input units can also be controlled in an activation or inactivation state according to a system mode. An operation of switch sensing an open/closed state of a liquid crystal display (LCD) can be controlled by a signal generated by the rotation operation of the display module. In a state in which at least one control value necessary for setting a system environment is stored in a memory, the system mode switching operation is monitored and the system environment is set according to the switched system mode.

5 Claims, 11 Drawing Sheets

U.S. PATENT DOCUMENTS

| | | |
|---|---|---|
| 6,327,653 B1 | 12/2001 | Lee |
| 6,366,935 B2 | 4/2002 | Hawkins et al. |
| 6,654,826 B1 | 11/2003 | Cho et al. |
| 6,711,004 B2 | 3/2004 | Yen et al. |
| 6,735,663 B2 * | 5/2004 | Watts et al. ............ 710/313 |
| 6,771,494 B2 | 8/2004 | Shimano |
| 6,788,527 B2 | 9/2004 | Doczy et al. |
| 6,903,927 B2 | 6/2005 | Anlauff |
| 7,148,877 B2 | 12/2006 | Chang et al. |
| 2002/0162444 A1 | 11/2002 | Yu et al. |
| 2002/0181722 A1 | 12/2002 | Hibino et al. |
| 2002/0198006 A1 | 12/2002 | Hirayama et al. |
| 2003/0093659 A1 | 5/2003 | Wen et al. |
| 2003/0188144 A1 | 10/2003 | Du et al. |
| 2003/0204708 A1 | 10/2003 | Hulme et al. |
| 2004/0001306 A1 * | 1/2004 | Oakley .................. 361/683 |
| 2004/0006690 A1 | 1/2004 | Du et al. |
| 2004/0027337 A1 | 2/2004 | Hunt et al. |
| 2004/0140967 A1 | 7/2004 | Kojo |
| 2005/0219217 A1 * | 10/2005 | Longobardi et al. ......... 345/169 |

OTHER PUBLICATIONS

J. Wittgen: "Riesencabrio Tablet PC Toshiba Portege 3500;" CT Magazin Fuer Computer Technik, Heise Zeitschriften Verlag, Hannover, DE, No. 3, Jan. 27, 2003, p. 67.

* cited by examiner

Notebook Computer Mode

_Tablet Computer Mode_

|  | Notebook Computer | Tablet Computer |
|---|---|---|
| NTB_TBL_Mode# | High | Low |
| Keyboard | Activation State | Inactivation State |

| Input | | Output |
|---|---|---|
| OE | Ain | Yout |
| H | L | L |
| H | H | H |
| L | X | Z |

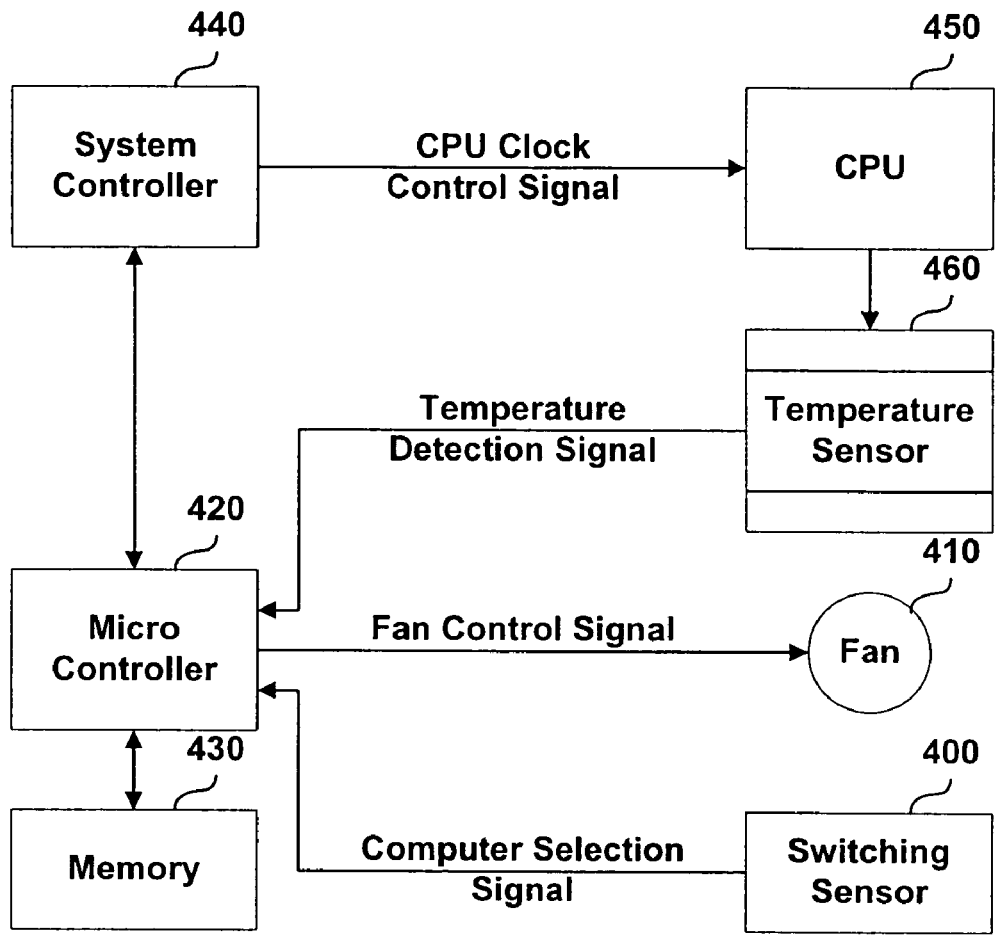

CONVERTIBLE COMPUTER WITH SELECTIVE ACTIVATION OF INPUT DEVICES BASED ON A TABLET OR NOTEBOOK MODE

This application is a Divisional of U.S. patent application Ser. No. 10/812,905, filed Mar. 31, 2004, which claims priority to Korean Application Nos. 10-2003-0055520, filed Aug. 11, 2003; 10-2003-0061549, filed Sep. 3, 2003; 10-2003-0061548, filed Sep. 3, 2003 and 10-2003-0063107, filed Sep. 9, 2003. The entire disclosure of the prior applications are considered as being part of the disclosure of the accompanying application and is hereby incorporated by reference.

BACKGROUND OF THE INVENTION

1. Field of the Invention

The present invention relates to a convertible computer equipped with a first mode (e.g., a notebook computer function) and a second mode (e.g., a tablet computer function).

2. Background of the Related Art

Tablet computers have been developed on the basis of advantageous effects of desktop, notebook and handheld computers. A notebook computer is referred to as a mobile computer. But, when the notebook computer is used, its main body must be positioned on a fixed base surface. Meanwhile, a tablet computer can be easily used on a user's hand like a personal digital assistant (PDA). The tablet computer enables the user to directly take notes on a monitor using an electronic pen in place of a keyboard. Since an input unit in the tablet computer is based upon a touch screen, a special input unit such as a mouse is not necessary, and hence, the tablet computer can be conveniently used. Thus, the tablet computer has excellent mobility and convenience. Furthermore, since the tablet computer includes the computer's basic components inside the monitor, its exterior is simple.

In order for the user to conveniently and selectively use a notebook computer function and a tablet computer function, a convertible computer that can implement the notebook computer function and the tablet computer function in a single system is being developed and commercialized.

The convertible computer includes a main module and a display module in which a liquid crystal display (LCD) and a digitizer are unified. The LCD displays video images and various menus. The digitizer allows the user to touch a screen using an electronic pen, etc. and to select and input the various menus displayed on the LCD.

As shown in FIG. 1, where the user uses the convertible computer as the notebook computer, he or she performs a desired function and task using a keyboard and a touch pad provided in a main body while the display module is fixed as the LCD of the notebook computer. Where the user uses the convertible computer as the tablet computer, he or she touches various menus displayed through the LCD using the electronic pen in a state while the LCD is overlapped with the computer's main body to face upwards as shown in FIG. 2. The digitizer installed at a front or back end of the LCD can detect a coordinate value corresponding to a position of the LCD touched with the electronic pen and can perform a user-desired function and task.

The display module can be rotated according to the user's selection. Thus, the user holding the convertible computer can rotate the display module so that it can be used as the tablet computer or the notebook computer.

In a prior art convertible computer, a fixed operating system (OS) such as Windows 98™ or Windows XP™ is loaded or booted. However, when a power supply of the convertible computer is turned on where the display module is rotated to perform a specific operating mode, for example, a tablet computer mode, a unique OS appropriate for the specific operating mode is not booted, which results in a condition in where various functions and operations cannot be provided.

On the other hand, a keyboard of the prior art notebook computer is configured like the keyboard of a prior art desktop keyboard as shown in FIG. 6. That is, a keyboard cable is connected between a keyboard 200 and a micro controller 210 serving as a keyboard controller so that various signals can be communicated. The keyboard of the notebook computer based upon the above-described components does not depend upon a system use state and an operating state in which the display module is open or closed.

When the convertible computer is used in the tablet computer mode, the display module is rotated and overlapped with the computer's main body, such that the LCD faces upwards. Thus, the backside of the display module undesirably presses input units such as the keyboard, a stick pointer and a touch pad (not shown). In this case, there is a problem in that an error of the system can be incurred. Further, when the convertible computer is used in the tablet computer mode, power can be unnecessarily supplied to the input units such as the keyboard 200, the stick pointer and the touch pad. Meanwhile, when the convertible computer is used in the notebook computer mode, power is unnecessarily supplied to the digitizer, such that power can be wasted.

FIG. 10 is a circuit diagram illustrating a circuit for switching an operating mode of the system to a suspend mode using a switch when the LCD is closed in the prior art notebook computer. In the prior art notebook computer, a switch SW1 is configured so that it can be in an ON state when the LCD is closed, and it can be in an OFF state when the LCD is open.

Thus, when the user switches an operating state of the LCD from the open state to the closed state in the prior art notebook computer, the switch SW1 is switched from the OFF state to the ON state, and an output terminal 310 come to output a low level signal. A controller (not shown in FIG. 10) into which the low level signal is inputted, detects the closed state of the LCD, and performs a control operation corresponding to the closed state of the LCD. Because it is determined that the computer is to be temporarily not used when the user closes the LCD, the operating mode of the system is switched to the suspend mode, and an operation for turning off an LCD backlight is performed so that unnecessary power consumption can be prevented. Otherwise, when the user switches the operating state of the LCD from the closed state to the open state, the switch SW1 come to be in the OFF state and the output terminal 310 come to output a high level signal. The controller into which the high level signal is inputted releases the suspend mode, and the system returns to a normal operating mode.

In the convertible computer in which the notebook computer function and the tablet computer function are implemented in the single system, when the system mode of the convertible computer is switched to a tablet computer mode, the display module is rotated and overlapped with the computer's main body, such that the LCD faces upwards. This state is the same as a state in which the LCD is closed in the prior art notebook computer. In this case, a switch capable of monitoring the open/closed state of the display module is operated when the operating mode is the tablet computer mode. Thus, there can be a problem in that the operating mode of the system is switched to the suspend mode or the backlight of the LCD provided in the display module is in the OFF state.

Since the notebook computer and the tablet computer have different purposes and usages, they have been independently implemented and used on the basis of different specifications. For example, the notebook computer and the tablet computer have different operating environments in terms of a central processing unit (CPU) speed, a system's internal temperature and fan speed. Where the notebook computer function and the tablet computer function are implemented in a single system, a method and apparatus for managing different use modes based upon the notebook computer function and the tablet computer function is needed.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus and method for convertible computer that selects and initializes the computer responsive to one of a first mode and a second mode.

Another object of the present invention is to provide an apparatus and method for a convertible computer that selects an initializes the computer responsive to a notebook computer function or a tablet computer function.

Another object of the present invention to provide an apparatus and method for booting a system in a convertible computer that can select an operating system (OS) according to a rotation state of a display module in the convertible computer that implements a notebook computer function and a tablet computer function.

Another object of the present invention to provide an apparatus and method that can protect at least one input unit in a convertible computer to reduce or prevent an erroneous operation.

Another object of the present invention to provide an apparatus and method that can reduce or prevent a state in which power is unnecessarily consumed by an input unit not used in a current system mode in a convertible computer that implements a notebook computer function and a tablet computer function in a single system.

Another object of the present invention to provide a protection circuit and method for use in a convertible computer, which can address a problem that an operating mode of a system is inappropriately switched to a suspend mode or a liquid crystal display (LCD) backlight is disabled when a tablet computer mode is used in the convertible computer that implements a notebook computer function and a tablet computer function in a single system.

Another object of the present invention to provide an apparatus and method that can manage a system mode in a single convertible system to control system environments according to various operating modes including a notebook computer function and a tablet computer function.

In order to achieve at least the above objects and advantages in whole or in part, in accordance with one aspect of the present invention there is provided a portable computer that includes a portable computer unit having a configuration that allows a system mode to be switched between a notebook computer mode and a tablet computer mode and a controller configured to determine the configuration of the portable computer unit responsive to a system power supply of the portable computer being turned on, wherein the controller operates an application program for the tablet computer mode or the notebook computer mode according to the determination.

To further achieve at least the above objects in whole or in part, in accordance with one aspect of the present invention there is provided an apparatus for booting a system in a portable computer including a display module whose rotation state allows a system mode to be switched to a notebook computer mode or a tablet computer mode that includes detection unit for detecting the rotation state of the display module when a system power supply provided in the portable computer is turned on and control unit for selectively booting an operating system (OS) for a tablet computer or a notebook computer according to a result of the detection.

To further achieve at least the above objects in whole or in part, in accordance with one aspect of the present invention there is provided a method for booting a system in a portable computer that includes detecting one of a notebook computer configuration and a tablet computer configuration when a system power supply provided in the portable computer is turned on and selectively booting an initialization application program for a tablet computer or a notebook computer according to said detecting.

To further achieve at least the above objects in whole or in part, in accordance with one aspect of the present invention there is provided an article including a machine-readable storage medium containing instructions for booting a system in a portable computer including a display module whose rotation state allows a system mode to be switched to a notebook computer mode or a tablet computer mode, the instructions, when executed, causing the portable computer to detect the rotation state of the display module when a system power supply provided in the portable computer is enabled and selectively boot an operating system (OS) for a tablet computer or a notebook computer according to the detection.

To further achieve at least the above objects in whole or in part, in accordance with one aspect of the present invention there is provided a portable computer that includes a portable computer device whose configuration allows a system mode to be switched to a notebook computer mode or a tablet computer mode, at least one input unit, a monitor configured to monitor a system mode switching operation and a controller coupled to the monitor and configured to control an operating state of the input unit to be inactive according to a current system mode.

To further achieve at least the above objects in whole or in part, in accordance with one aspect of the present invention there is provided an apparatus for protecting at least one input unit in a portable computer including a first input unit including a touch screen digitizer and a second input unit selectively including at least one of a keyboard, a stick pointer and a touch pad, and a portable computer device whose configuration state is configured to switch a system mode to a notebook computer mode or a tablet computer mode that includes monitoring unit for monitoring a system mode switching operation and control unit for controlling an operating state of the input units to be an inactivation state according to a current system mode.

To further achieve at least the above objects in whole or in part, in accordance with one aspect of the present invention there is provided a method for protecting at least one input unit in a portable computer including a display module whose rotation state allows a system mode to be switched between a notebook computer mode and a tablet computer mode that includes monitoring a system mode switching operation and controlling an operating state of the input unit to be each of an active state and an inactive state according to a current system mode.

To further achieve at least the above objects in whole or in part, in accordance with one aspect of the present invention there is provided an article including a machine-readable storage medium containing instructions for protecting first input unit including a touch screen digitizer, and a second input unit selectively including at least one of a keyboard, a stick pointer and a touch pad in a portable computer including a display module whose rotation state allows a system mode to be switched between a notebook computer mode and a tablet computer mode, the instructions, when executed, causing the portable computer to monitor a system mode switching operation and control an operating state of at least one input unit to be each of an activation state and inactivation state according to a current system mode.

To further achieve at least the above objects in whole or in part, in accordance with one aspect of the present invention there is provided a portable computer that includes a display module whose rotation state allows a system mode to be switched to a notebook computer mode or a tablet computer mode, a first switch configured to sense opening and closing operations of the display module, a second switch configured to sense a rotation operation of the display module, a logic device configured to output an open/close signal of the display module based on a signal of the first switch and a logic device controller configured to control the logic device to be in an enable/disable state based on a signal of the second switch.

To further achieve at least the above objects in whole or in part, in accordance with one aspect of the present invention there is provided a protection circuit provided in a portable computer including a display module whose rotation state allows a system mode to be switched to a notebook computer mode or a tablet computer mode, a first switch for sensing opening and closing operations of the display module, and a second switch for sensing a rotation operation of the display module that includes a logic device configured to output an open/close signal of the display module based upon an operation of the first switch and a logic device controller configured to control the logic device to be in an enable/disable state based upon an operation of the second switch.

To further achieve at least the above objects in whole or in part, in accordance with one aspect of the present invention there is provided a portable computer that includes a controller configured to set a system performance operation based upon the portable computer operating in each of a notebook computer mode or a tablet computer mode and a memory configured to store at least one control value necessary for setting the system performance operation in said each mode.

To further achieve at least the above objects in whole or in part, in accordance with one aspect of the present invention there is provided an apparatus for managing a system mode in a portable computer including a notebook computer mode or a tablet computer mode that includes monitoring unit for monitoring a system mode switching operation and setting unit for setting different system power consumption environments based upon a current system mode.

To further achieve at least the above objects in whole or in part, in accordance with one aspect of the present invention there is provided a method that includes operating a portable computer in a notebook computer mode and a tablet computer mode, wherein devices in the portable computer operate in each mode and operating at least one device in the portable computer at a first power consumption level in the notebook computer mode and a second lower power consumption level in the tablet computer mode.

To further achieve at least the above objects in whole or in part, in accordance with one aspect of the present invention there is provided a method for managing a system mode in a portable computer having a configuration that switches a system mode to a notebook computer mode or a tablet computer mode that includes monitoring a system mode switching operation, setting at least one control value necessary for switching a system performance based upon the switched system mode.

To further achieve at least the above objects in whole or in part, in accordance with one aspect of the present invention there is provided an article including a machine-readable storage medium containing instructions for managing a system mode in a portable computer including a display module whose rotation state allows the system mode to be switched to a notebook computer mode or a tablet computer mode, the instructions, when executed, causing the portable computer to monitor a system mode switching operation, read, from a memory, at least one control value necessary for setting a system environment based upon the switched system mode when the system mode is switched and set the system environment based upon the read control value.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 14 is a block diagram illustrating a preferred embodiment of an apparatus for managing a system mode in the convertible computer in accordance with the present invention;

FIG. 15 is a diagram of a table illustrating exemplary control values based upon each system mode stored in a memory in accordance with the present invention.

DETAILED DESCRIPTION OF PREFERRED EMBODIMENTS

Embodiments of an apparatus and method for booting a system in a convertible computer, an apparatus and method for protecting at least one input unit in a convertible computer, a protection circuit and method for use in a convertible computer, and an apparatus and method for managing a system mode in a convertible system in accordance with the present invention will now be described.

An embodiment of a system booting or initialization apparatus and method in accordance with the present invention can be applied to a convertible computer that can be selectively used in a notebook computer mode and a tablet computer mode according to a configuration such as the rotation state of a display module. The display module preferably combines a liquid crystal display (LCD) and a digitizer. The display module can be rotatably coupled to a main module.

Figure 1:
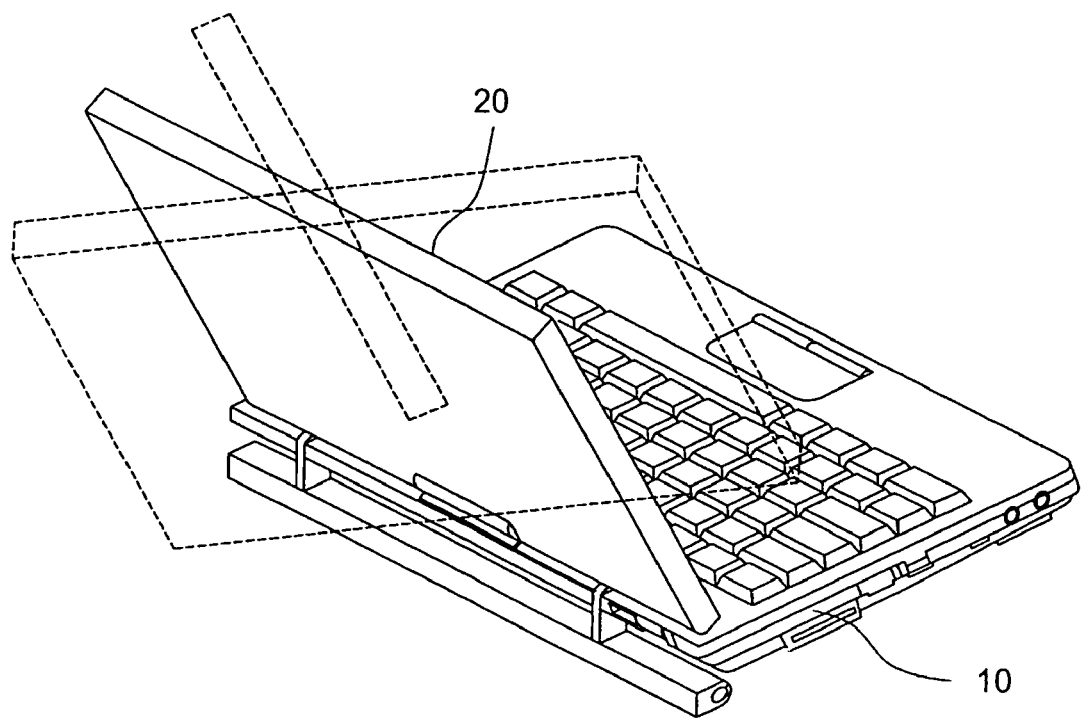
FIG. 1 is a perspective view illustrating a prior art convertible computer used in a notebook computer mode.
Figure 2:
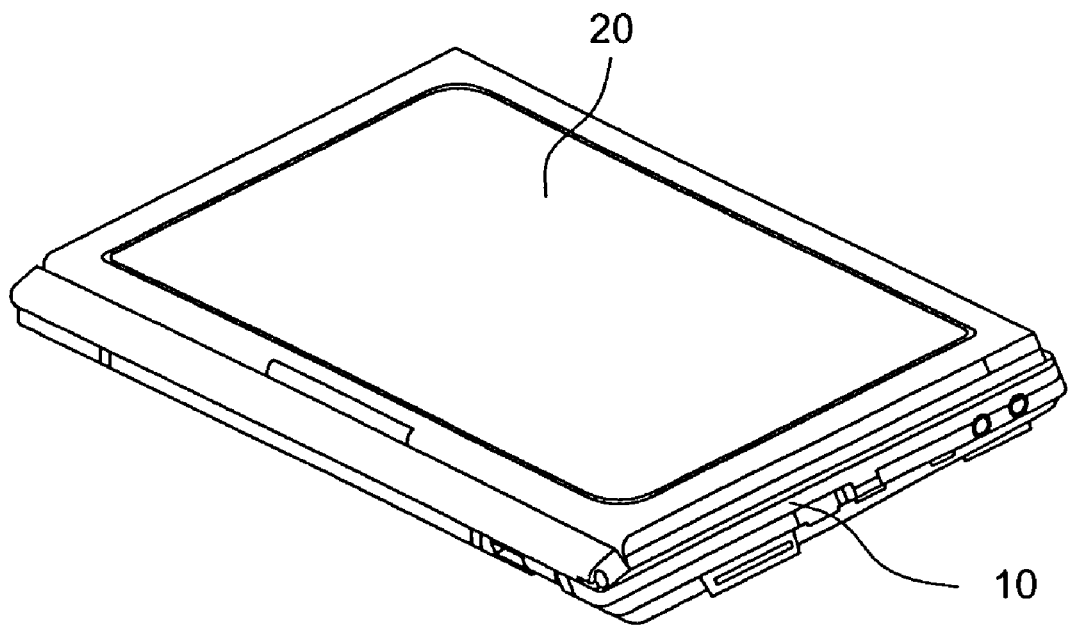
FIG. 2 is a perspective view illustrating a prior art convertible computer is used in a tablet computer mode.

Thus, embodiments of a system booting apparatus and method can be described using and applied to the convertible computer shown in FIGS. 1-2. However, the present invention is not intended to be so limited.

Where the convertible computer is used as a tablet computer, a display module 20 is rotated and its front side faces upwards (e.g., FIG. 2). Further, when the display module is opened and faces forwards, the convertible computer can be used as a notebook computer (e.g., FIG. 1).

Figure 3:
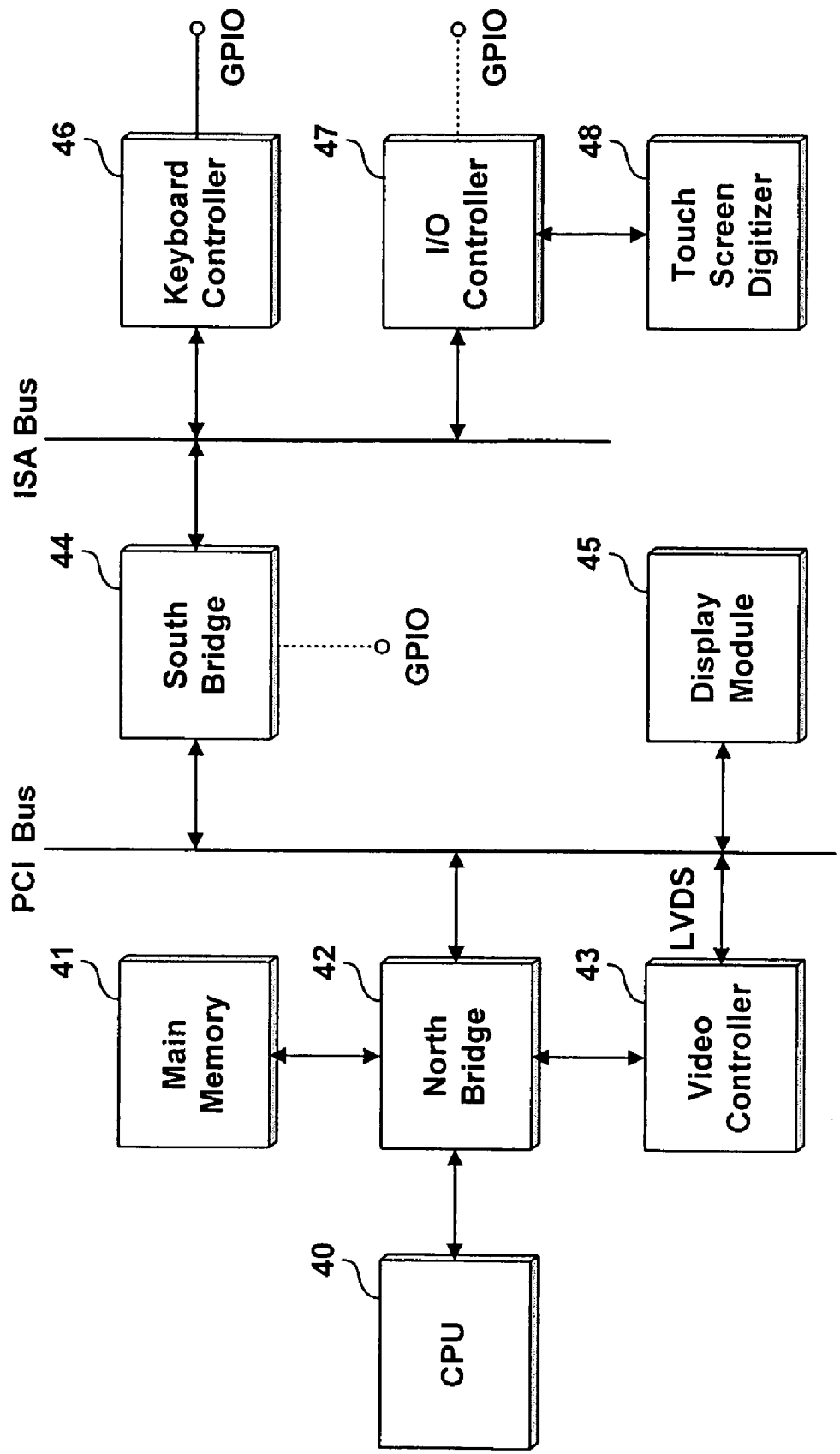
FIG. 3 is a block diagram illustrating a configuration of a preferred embodiment of a convertible computer in accordance with the present invention.

FIG. 3 is a block diagram illustrating an embodiment of a convertible computer in accordance with the present invention. The convertible computer can include a central processing unit (CPU) 40, a main memory 41, a north bridge 42, a video controller 43, a south bridge 44, a display module 45, a keyboard controller 46, an input/output (I/O) controller 47, a touch screen digitizer 48 and others. The touch screen digitizer 48 can be mounted on the entire surface of the display module 45 and can output a coordinate value of a position on which the user carries out a selection operation (e.g., a touch operation) to the I/O controller 47. A switch capable of sensing the rotation of the display module 45 can be coupled to one general-purpose input/output (GPIO) pin assigned to the keyboard controller 46. However, the present invention is not intended to be so limited, for example, the switch capable of sensing the rotation operation of the display module 45 can be coupled to GPIO pins of the keyboard controller 46, the south bridge 44, the I/O controller 47 and other devices.

Figure 4:
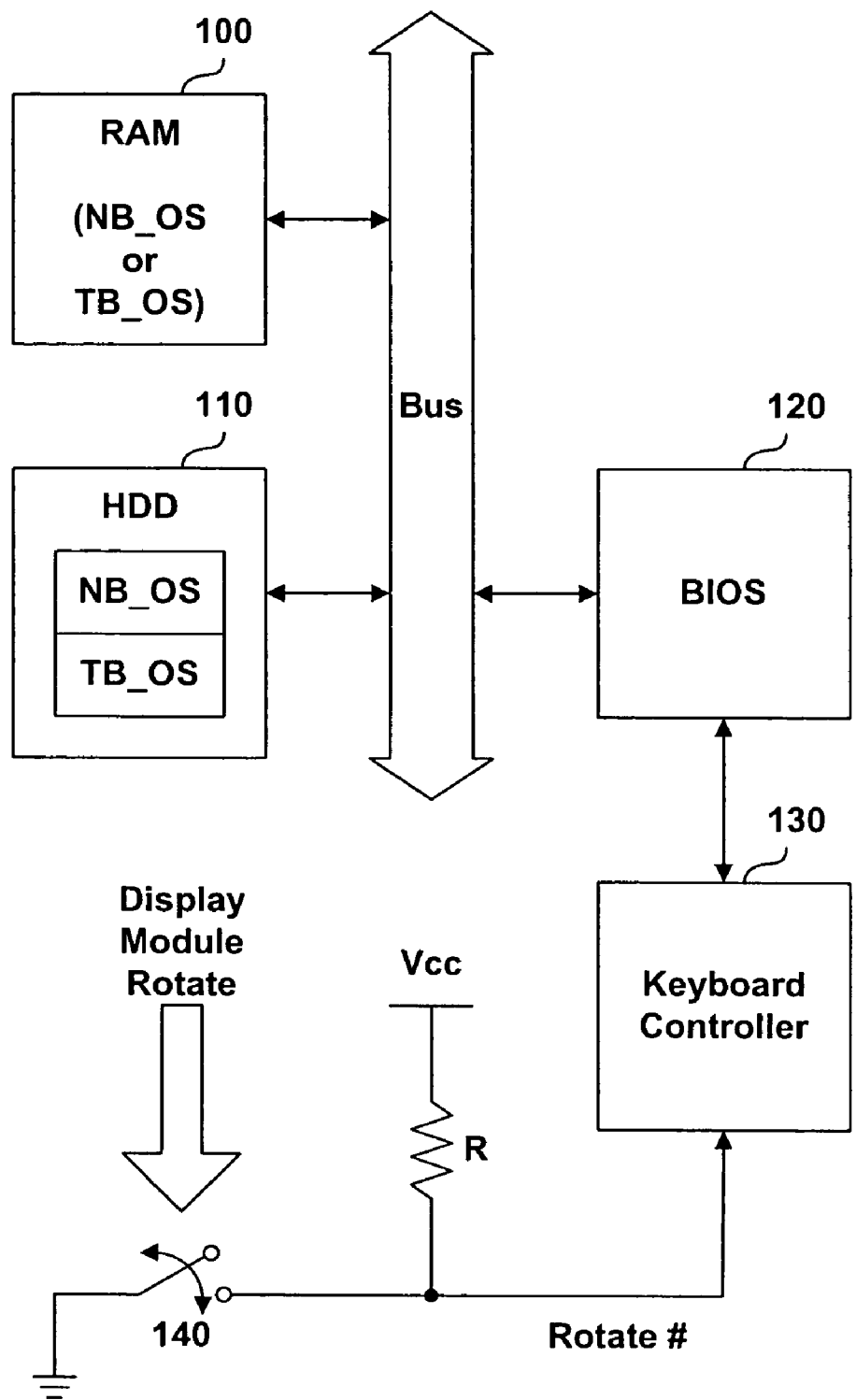
FIG. 4 is a schematic diagram illustrating a preferred embodiment of an apparatus for booting a system in the convertible computer in accordance with the present invention.

As shown in FIG. 4, an embodiment of a system booting apparatus provided in the convertible computer in accordance with the present invention can include a random access memory (RAM) 100, a hard disc 110, a basic input/output system (BIOS) 120, a keyboard controller 130, a rotation detection switch 140, etc. The rotation detection switch 140 can be in an ON or OFF state according to the rotation state of the display module in which the LCD and the digitizer are unified.

The rotation detection switch 140 can monitor a system mode switching operation. The rotation detection switch 140 can be turned on/off, for example, by a magnetic sensor for electrically detecting the rotation operation of the display module or a mechanical contact.

The keyboard controller 130 can use a rotation detection signal generated according to the ON/OFF state of the rotation detection switch 140 to determine whether the display module is currently in the notebook computer mode or the tablet computer mode. For example, where the rotation detection switch 140 is in the ON state and a rotation detection signal Rotate# is outputted as a low level signal, it can be determined that the display module has been rotated to perform the tablet computer mode. On the other hand, where the rotation detection switch 140 is in the OFF state and the rotation detection signal Rotate# is outputted as a high level signal, it can be determined that the display module has been rotated to perform the notebook computer mode. The keyboard controller 130 can use a micro controller, microcomputers or the like.

Where the BIOS 120 confirms that the display module has been set to the notebook computer mode (e.g., through an interface with the keyboard controller 130), the BIOS 120 can select the notebook computer-based operating system NB_OS stored in the hard disc 110 and upload the selected notebook computer-based OS NB_OS to the RAM 100. The system can then be booted and operated by the notebook computer-based OS NB_OS.

Thus, a system physical configuration or the like can determine the tablet or notebook computer mode. Where the BIOS 120 confirms that the display module has been set to the tablet computer mode through the interface with the keyboard controller, the BIOS 120 can select the tablet computer-based operating system TB_OS stored in the hard disc 110 and upload the selected tablet computer-based OS TB_OS to the RAM 100. The system can then be booted and operated by the tablet computer-based OS TB_OS.

Figure 5:
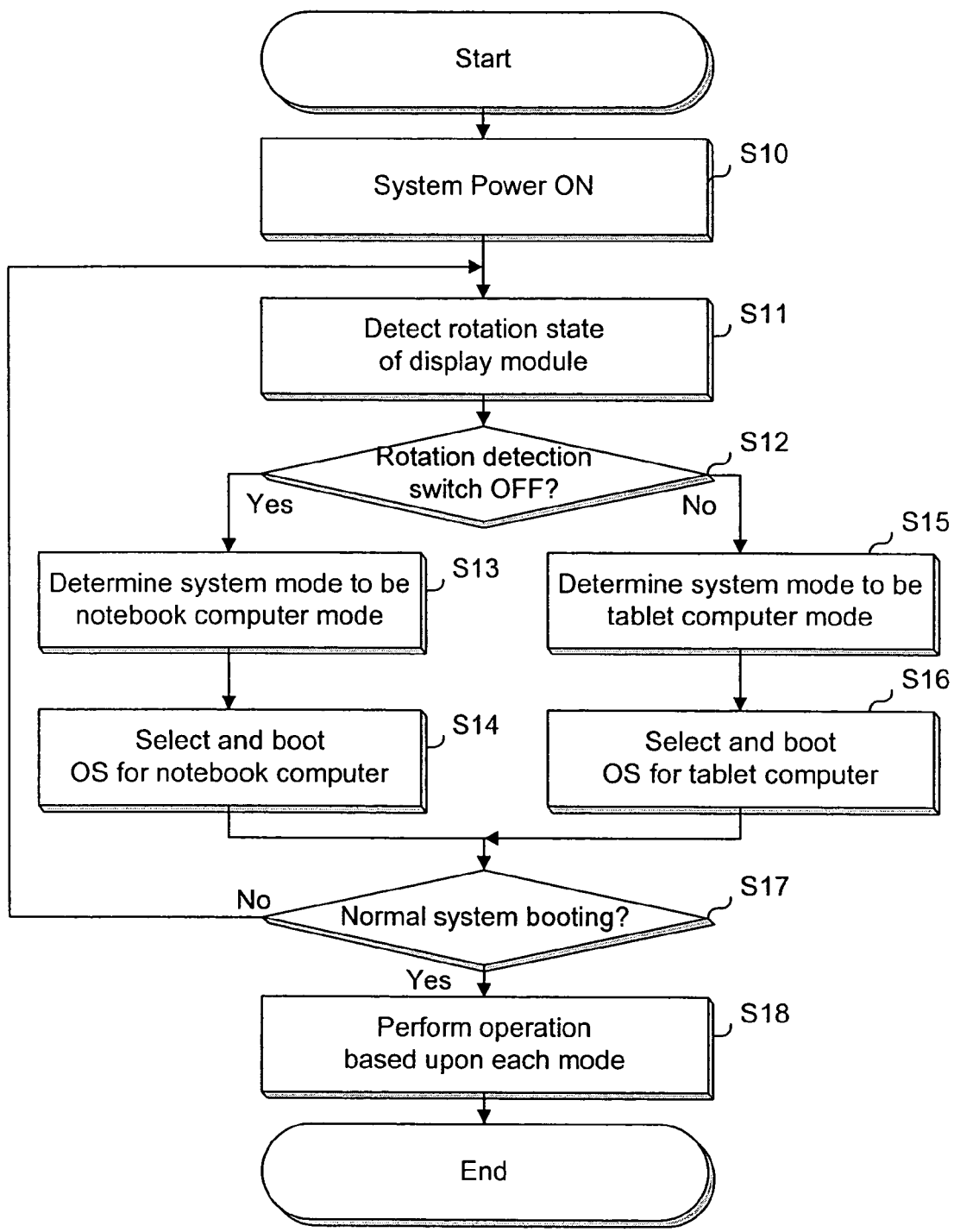
FIG. 5 is a flowchart illustrating a preferred embodiment of a method for booting the system in the convertible computer in accordance with the present invention.
Figure 6:
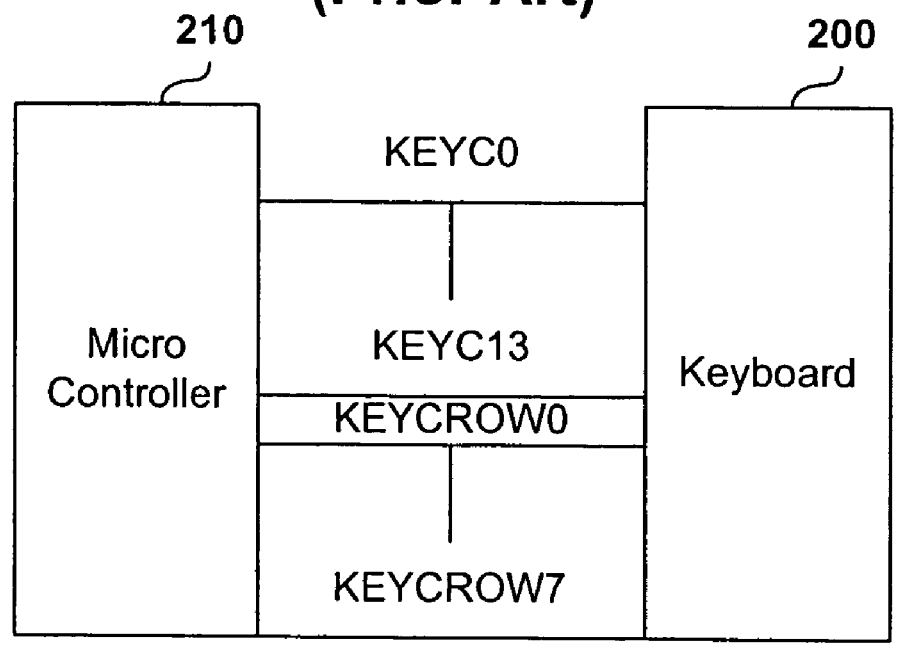
FIG. 6 is a schematic diagram illustrating the connection relationship between a keyboard and a micro controller in a prior art notebook computer.

FIG. 5 is a flow chart illustrating an embodiment of a method for booting a convertible computer in accordance with the present invention. The embodiment of a method for booting a convertible computer will be described using and can be applied to the system of FIG. 4. However, the present invention is not intended to be so limited.

As the display module is moved, positioned or rotated, the notebook computer mode or the tablet computer mode is selectively and conveniently used in the convertible computer. Where the user turns on a system power supply of the convertible computer (block S10), the system can detect a configuration of the convertible computer. For example, the keyboard controller 130 can check a level of a rotation detection signal Rotate# indicative of an ON/OFF state of the rotation detection switch 140 and detect a rotation state of the display module (S11).

Where the rotation detection signal Rotate# is a high level signal immediately after the system power supply is in the ON state, for example, where the rotation detection switch 140 is in the OFF state (block S12), the keyboard controller 130 can determine that the operating mode has been set to the notebook computer mode (block S13). The BIOS 120 can confirm a currently set computer mode through the interface with the keyboard controller 130, read the notebook computer-based OS NB_OS between the notebook computer-based OS NB_OS and the tablet computer-based OS TB_OS previously stored in the hard disc 110, and upload the read notebook computer-based OS to the RAM 100. Then, a set of operations is performed so that the system can be booted and operated by the notebook computer-based OS (block S14).

Where the rotation detection signal Rotate# is a low level signal immediately after the system power supply is in the ON state, for example, where the rotation detection switch 140 is in the ON state (block S12), the keyboard controller 130 can determine that the operating mode has been set to the tablet computer mode (block S15). The BIOS 120 can confirm a currently set computer mode through the interface with the keyboard controller 130, read the tablet computer-based OS TB_OS between the notebook computer-based OS NB_OS and the tablet computer-based OS TB_OS previously stored in the hard disc 110, and upload the read tablet computer-based OS to the RAM 100. Then, a set of operations is performed so that the system can be booted and operated by the tablet computer-based OS (block S16).

If the booting operation is performed normally (block S17), the booted notebook computer-based OS or tablet computer-based OS can provide a functions and operations appropriate for the notebook computer mode or the tablet computer mode to the user (block S18). From block S18, the process can be completed.

Figure 7:
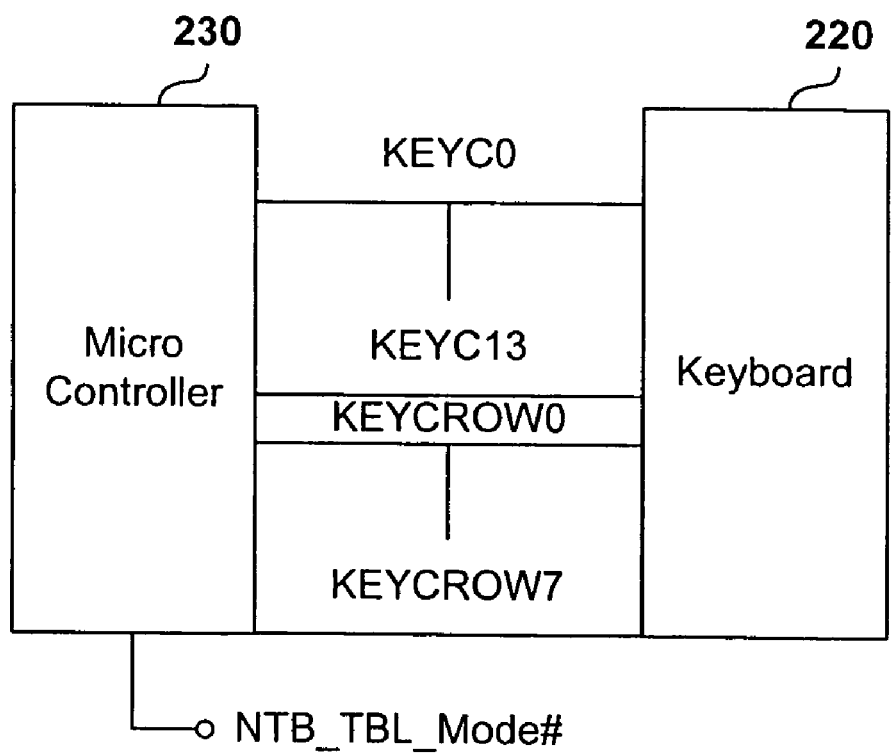
FIG. 7 is a schematic diagram illustrating a preferred embodiment of an apparatus for protecting the keyboard in the convertible computer in accordance with the present invention.

FIG. 7 is a schematic diagram illustrating an embodiment of an apparatus configured to protect at least one input unit in a convertible computer in accordance with the present invention. As an example, an input unit uses the keyboard in FIG. 7. However, the present invention is not intended to be so limited because an input device, a stick pointer, a touch pad or the like can be used as the input unit.

One embodiment of a convertible computer is configured so that a rotation detection switch is operated when the operation mode of the system is switched. As shown in FIG. 7, a signal NTB_TBL_MODE# generated according to operations of the rotation detection switch is inputted into a micro controller 230 serving as a keyboard controller. As shown in FIG. 7, the micro controller 230 can assign one pin for monitoring the system mode, and can be coupled to the keyboard 220 through keyboard cables KEYC0~KEYC13 and KEYCROW0~KEYCROW7.

The micro controller 230 can recognize the system mode based upon a signal generated from the rotation detection switch. As shown in an exemplary table in FIG. 8, the rotation detection switch preferably generates the high level signal in the notebook computer mode and generates the low level signal in the tablet computer mode. The rotation detection switch can be configured so that it can output the high or low level signal to the micro controller 230. The micro controller 230 can perform a control operation for an activation state of the keyboard in the notebook computer mode and can perform operations based upon an input signal of the keyboard. Further, the micro controller 230 can perform a control operation for an inactivation state of the keyboard in the tablet computer mode and can ignore input signals of the keyboard.

Figures 8, 9:
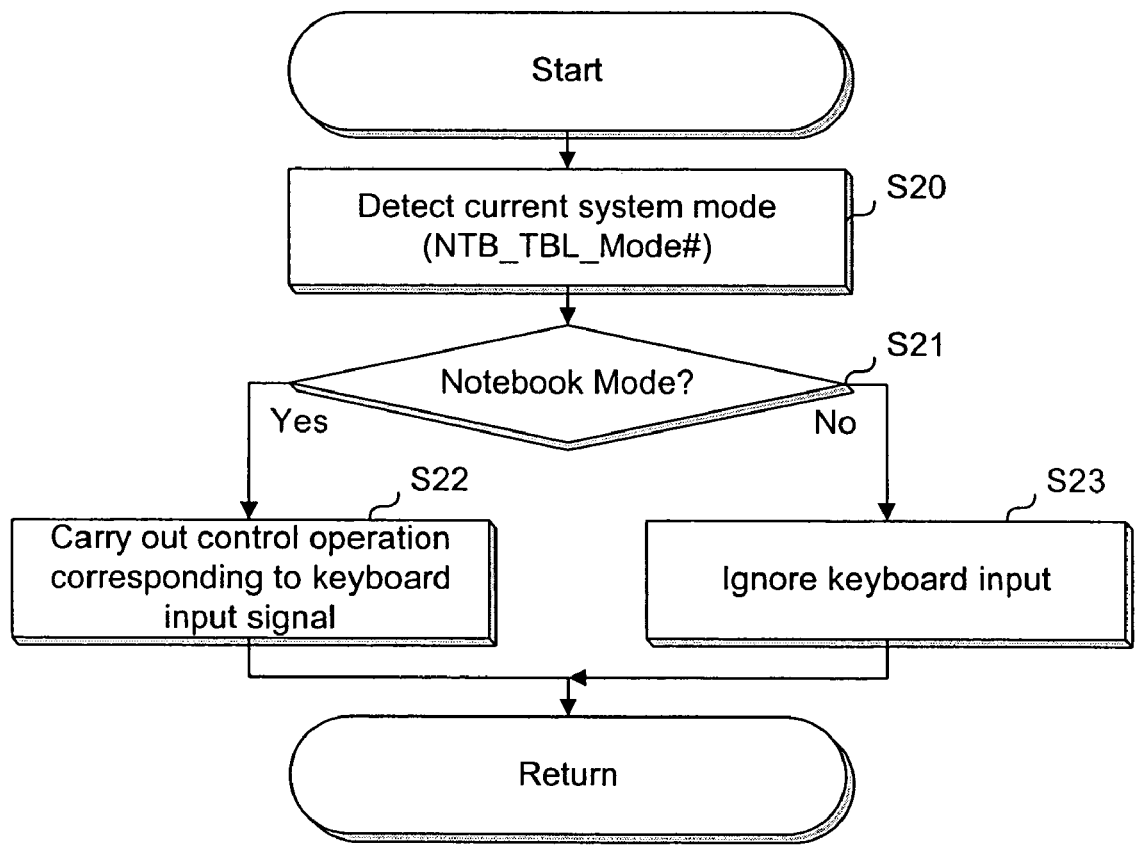
FIG. 8 is a diagram of an exemplary table illustrating an operating state of the keyboard in the convertible computer in accordance with the present invention.
FIG. 9 is a flow chart illustrating a preferred embodiment of a method for protecting the keyboard in the convertible computer in accordance with the present invention.
Figure 10:
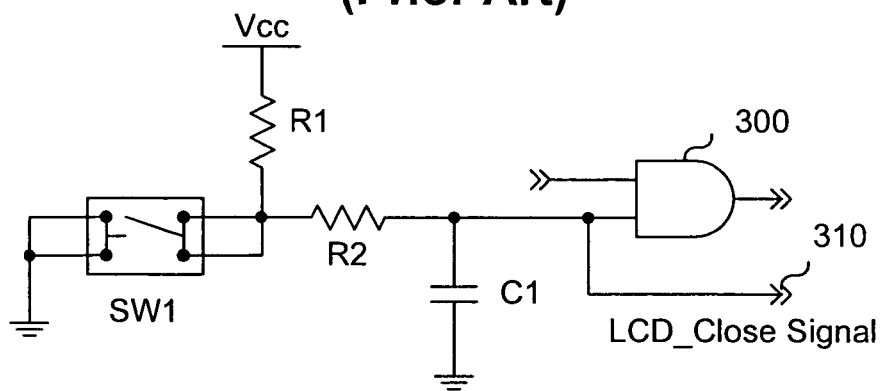
FIG. 10 is a circuit diagram illustrating a circuit for detecting an operating state in which a liquid crystal display (LCD) is closed in a prior art notebook computer.

FIG. 9 is a flow chart illustrating an embodiment of a method for protecting at least one input unit in the convertible computer in accordance with the present invention. The input unit can be the keyboard, however, a stick pointer, touch pad or the like can be used as the input unit. The embodiments of a method for protecting at least one input unit in a convertible computer can be applied to and described using the apparatus of FIG. 7.

As shown in FIG. 9, when system power is supplied, the micro controller 230 can monitor an operating state of the keyboard 220 coupled through a keyboard cable at all times. Further, where an arbitrary key is selected from among keys of the keyboards, the micro controller 230 can confirm the selected key and perform an operation corresponding to the selected key. Such operations are valid only when the convertible computer is used in the notebook computer mode. Thus, the micro controller 230 can recognize a current system mode, and perform control operations so that a keyboard operation corresponding to the recognized system mode can be carried out.

As shown in FIG. 9, the micro controller 230 can monitor a signal (e.g., NTB_TBL_MODE# from the rotation detection switch) at all times, and detect the current system mode based upon the monitored signal (block S20). Thus, the micro controller 230 can recognize a current system mode, and perform control operations so that a keyboard operation corresponding to the recognized system mode can be carried out.

When the current system mode is the notebook computer mode (block S21), the signal NTB_TBL_MODE# from the rotation detection switch inputted into the micro controller 230 can become a high level signal. At this point, the micro controller 230 can control a signal line, coupled to the keyboard 220, to be in an activation state and perform normal operations relating to a selection operation in the keyboard 220 (block S22).

When the current system mode is the tablet computer mode (block S21), the signal NTB_TBL_MODE# from the rotation detection switch inputted into the micro controller 230 can become a low level signal. At this point, the micro controller 230 can place a signal line, coupled to the keyboard 220 in an inactivation state. Even though a key of the keyboard 220 is pressed, the micro controller 230 can ignore an input signal from the keyboard 220 (block S23).

In addition, a first input unit can be available and second input unit may not be available according to the system mode in embodiments according to the present invention. For example, where the system is used in the notebook computer mode, the touch screen digitizer can be used or not used. Where the system is used in the tablet computer mode, the keyboard, the stick pointer and the touch pad may not be available.

There can be added disadvantages because power is unnecessarily supplied to an input unit not used according to a current system mode. To address such disadvantages, power to each input unit can be switched using a signal from a GPIO terminal coupled to the keyboard controller, the south bridge, the I/O controller or another device that monitors or receives the convertible computer system mode, for example, by being coupled to the switch capable of detecting a system mode switching operation as shown in FIG. 3. That is, as a field effect transistor (FET) switch can be turned on/off using the GPIO terminal signal, the power to each input unit can be switched or controlled. Thus, when the system is used in the notebook computer mode, the power to the touch screen digitizer, which may be not used, can be in the OFF state and be inactivated. Further, when the system is used in the tablet computer mode, power to the keyboard, the stick pointer, the touch pad or the like, which are not available (e.g., OFF and inactivate), can be directly or automatically interrupted.

Figure 11:
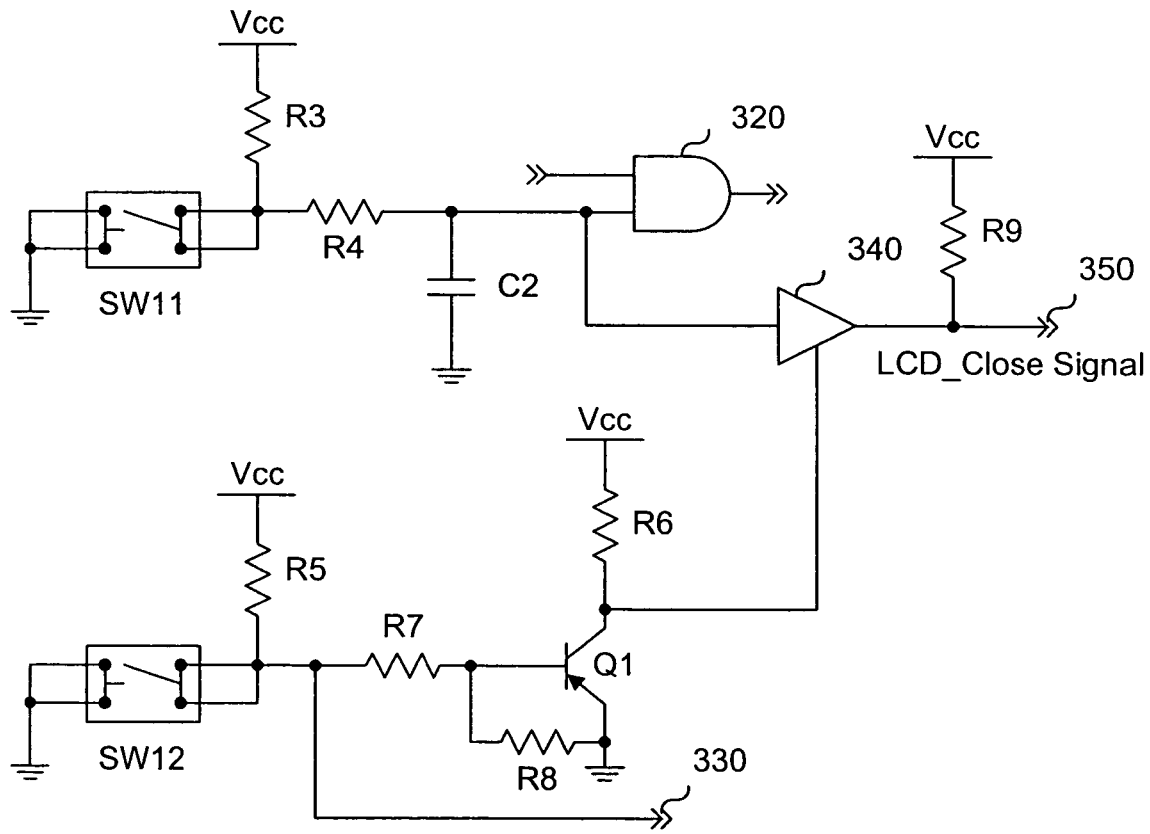
FIG. 11 is a circuit diagram illustrating a configuration of a preferred embodiment of a protection circuit in a convertible computer in accordance with the present invention.

FIG. 11 is a circuit diagram illustrating an embodiment of a protection circuit in the convertible computer in accordance with the present invention. As shown in FIG. 11, the protection circuit can include a switch SW11 operable as the display module is closed and a switch SW12 operable as the display module is rotated. The switch SW11 can be turned on when the display module is closed, and the switch SW12 can be turned on when the display module is rotated.

Figures 12, 13:
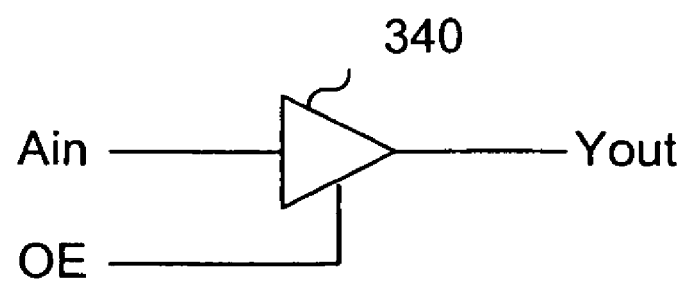
FIG. 12 is a circuit diagram illustrating an exemplary logic device for use in the present invention.
FIG. 13 is a diagram of an exemplary table illustrating an operating state of the logic device for use in the present invention.

As shown in FIGS. 12 and 13, an exemplary logic device 340 can be enabled when a high level signal is applied to a gate terminal OE provided in the logic device 340. Thus, when the high level signal is applied to the gate terminal OE, a signal inputted into an input terminal AIN can be outputted. That is, when the high level signal is applied to the gate terminal OE, the logic device 340 can output the high level signal when the input signal is high and output the low level signal when the input signal is low.

Operations of the protection circuit of FIG. 11 will now be described. When the convertible computer is operated as the notebook computer, the switch SW12 is in the OFF state, and a transistor Q1 operating according to the operation of the switch SW12 maintains the OFF state while the high level signal is applied to a base terminal provided in the transistor Q1. When the transistor Q1 is in the OFF state, power supply voltage of a power supply terminal Vcc is applied to the gate terminal of the logic device 340 as the high level signal, enabling the logic device 340.

In this state, the operating state of the switch SW11 is switched to the ON state when the user closes the display module, and then the low level signal is inputted into an input terminal of an AND gate 320 and the input terminal of the logic device 340. Thus, the logic device 340 outputs the low level signal.

In response to the low level signal, a signal indicating that the LCD has been closed is outputted to a controller (not shown). The controller into which the LCD closing signal is inputted can switch the operating mode to a suspend mode and/or turn off the LCD backlight.

In a state in which the logic device 340 is enabled, the operating state of the switch SW11 is switched to the OFF state when the user opens the display module, the high level signal is outputted to the input terminals of the AND gate 320 and the logic device 340. The logic device 340 outputs the high level signal. In response to the high level signal, a signal indicating that the LCD has been opened is outputted to the controller. The controller can perform corresponding control signals in response to the LCD open signal.

Operations of the protection circuit of FIG. 11 will now be described when the convertible computer is operated as the tablet computer. When the user uses the convertible computer in the tablet computer mode, the display module is rotated and an operating state of the switch SW12 is switched to the ON state. Thus, a signal from the power supply terminal Vcc is grounded through a resistor R5 and the switch SW12. A signal 330 based upon the ON state of the switch SW12 is inputted into a system controller (not shown). The system controller can perform a preparation operation for the tablet computer mode.

At this point, the low level signal is applied to the base terminal of the transistor Q1, and the transistor Q1 is in the ON state. When the transistor Q1 is in the ON state, the signal from the power supply terminal Vcc is grounded through a resistor R6 and collector and emitter terminals of the transistor Q1. In this state, the low level signal is applied to the gate terminal of the logic device 340 and the logic device 340 is disabled.

In a state in which the logic device 340 is disabled, the logic device 340 outputs no signal even though the switch SW11 capable of detecting an open/closed state of the display module outputs a signal. Thus, the controller does not perform a control operation (e.g., the suspend mode and/or LCD backlight turn-off control operation) based upon the output signal of the logic device 340.

FIG. 14 is a block diagram illustrating an embodiment of an apparatus for managing the system mode in the convertible computer in accordance with the present invention. As shown in FIG. 14, the convertible computer can include a central processing unit (CPU) 450, and a system controller 440 equipped with a core chipset responsible for data transfer and control functions associated with a memory, a micro controller and various peripheral devices.

The convertible computer can include a micro controller 420 for controlling input units such as a keyboard, a mouse, a battery power supply, a battery interface and others. The system controller 440 can set a system environment appropriate for a current system mode under the control of the micro controller 420. Thus, the system controller 440 can further include a clock generator, other circuit logics, and a BIOS and utility program for operating them.

As shown in FIG. 14, the convertible computer can include a memory such as a nonvolatile flash memory 430 for storing a program and data necessary for performing an operation. The flash memory 430 can store a BIOS being a kind of program necessary for transferring information between peripheral devices such as a memory, a disc and a monitor, and can also store information associated with respective management modes and conditions and states corresponding to the management modes.

As shown in FIG. 14, the convertible computer can include a switching sensor 400 for monitoring a switching operation between the notebook computer mode and the tablet computer mode. The micro controller 420 can discriminate a system operating mode in response to a sensing signal from the switching sensor 400 (e.g., a computer selection signal) and perform a control operation corresponding to the discriminated system operating mode. Thus, the switching sensor 400 can be composed of a switch turned on/off according to a rotation operation of the display module.

The convertible computer can include a temperature sensor 460 for sensing a temperature of the CPU 450 and a cooling fan 410 for removing heat generated by the system. The memory 430 in accordance with the embodiment of FIG. 14 can store control values of the notebook computer mode and control values of the tablet computer mode. The control values stored in the memory 430 can include a CPU speed, a fan speed, a system temperature or the like.

FIG. 15 shows a table of exemplary control values. The control values of each mode shown in FIG. 15 can be expressed as relative values. However, the present invention is not intended to be so limited as specific values corresponding to devices or operational environments can be used. The CPU speed can be low in the tablet computer mode, but the CPU speed of the notebook computer mode must be set to a relatively high speed in comparison with that of the tablet computer mode. The system temperature can be set to a low temperature in the tablet computer mode, but the system temperature of the notebook computer mode must be set to a relatively high temperature in comparison with that of the tablet computer mode.

Further, the fan speed can be set to a low speed in the tablet computer mode. However, the fan speed of the notebook computer mode must be set to a relatively high speed in comparison with that of the tablet computer mode.

The control values shown in FIG. 15 are relative control values between the notebook computer mode and the tablet computer mode. After an allowable range up to a highest or a maximum value on a mode-by-mode basis is decided, it is preferable that a control operation is carried out through multiple steps within the allowed range. For example, it is preferable that a range of the system temperature is set and then the CPU speed and the fan speed are set according to the temperature range. That is, when the system temperature is set to within an "A" range (e.g., sub-range of the allowed range), the CPU speed is set to a CA speed and the fan speed is set to an FA speed. Further, when the system temperature is set to within a "B" range, the CPU speed is set to a CB speed and the fan speed is set to an FB speed. In this case, the CPU speed and the fan speed can be adjusted through multiple steps within the allowed range.

Information of the currently set system mode can be stored in the system controller 440. It is preferable that information of a currently set system mode is stored in a complementary metal oxide semiconductor (CMOS) of the chipset provided in the controller 440. A menu for setting the system mode is preferably provided in a CMOS setup menu. At the time of performing the CMOS setup operation, a new system mode is set and stored information relating to the new system mode can be confirmed. Thus, a system environment can be controlled according to the newly set or confirmed system mode.

Figure 16:
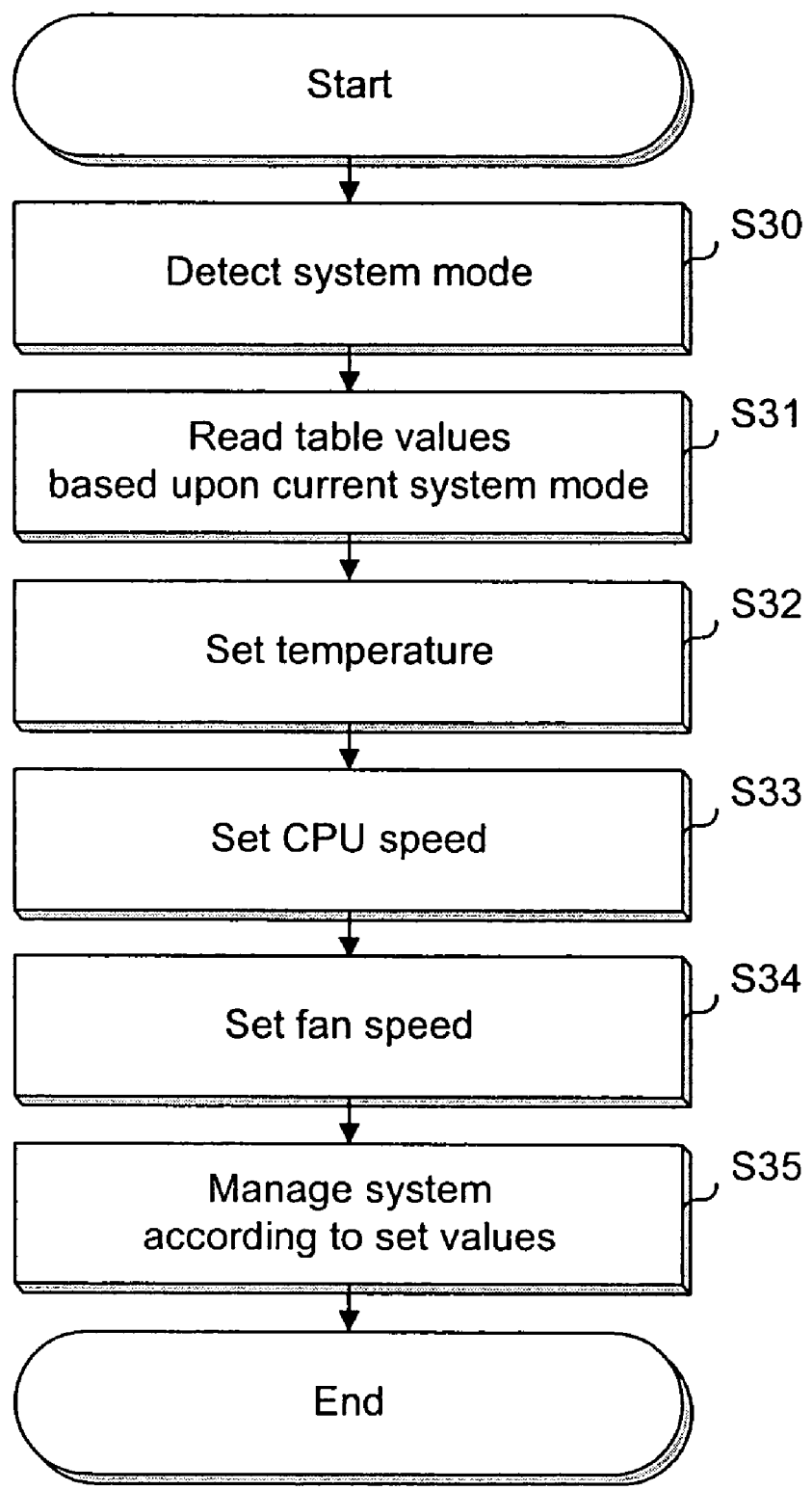
FIG. 16 is a flow chart illustrating a preferred embodiment of a method for managing a system mode in the convertible computer in accordance with the present invention.

FIG. 16 is a flow chart illustrating an embodiment of a method for managing the system mode in the convertible computer in accordance with the present invention. The embodiment of a method for managing the system mode can be described using and applied to the apparatus of FIG. 14. However, the present invention is not intended to be so limited.

As shown in FIG. 14, when the user turns on a system power supply of the convertible computer, the system controller 440 can sense the turned-on system power supply and apply a wake-up signal to the CPU 450. In response to the wake-up signal, the CPU 450 can control an initial booting operation. At the time of performing the initial booting operation, a read only memory (ROM) BIOS stored in the memory 430 can detect a current system mode such as one set in the CMOS setup menu (block S30).

The system controller 440 can confirm the current system mode detected at block S30, and read control values appropriate for the current system mode from among the control values associated with the modes preferably stored in the memory 430 (block S31). The system controller 440 can set an operating state of the system according to the read control values. If the current system mode is the notebook computer mode, the system temperature can be set high (block S32), the CPU speed can be set to a high speed (block S33), and the fan speed can be set to a high speed (block S34). Then, the system can be managed according to the control values corresponding to the detected system mode (block S35).

At this time, the system controller 440 can adjust an operating speed of the CPU 450 to the set speed at block S33 through a CPU clock control signal. When the CPU 450 is operated at the set speed, the temperature sensor 460 senses a temperature inside the system varying with the heat generated by the CPU 450. A signal indicating the temperature sensed by the temperature sensor 460 is applied to the micro controller 420. In response to the signal from the temperature sensor 460, the micro controller 420 can control the speed of the cooling fan 410 within its speed range allowable in the current system mode and adjust the temperature inside the system.

When the temperature inside the system increases because of the system operation, the speed of the cooling fan 410 becomes fast. On the other hand, when the temperature inside the system decreases, the speed of the cooling fan 410 becomes slow. Further, when the temperature inside the system increases because of the system operation, an allowable range of a CPU clock signal can become narrower. On the other hand, when the temperature inside the system decreases, an allowable range of a CPU clock signal can become wider.

The system mode can be switched such as from the notebook computer mode to the tablet computer mode or is switched from the tablet computer mode to the notebook computer mode responsive to a physical configuration of the system. However, the present invention is not intended to be so limited, for example, a user action such as a toggle switch or a software application operation can be used to switch among system modes, which can include additional modes.

When the system mode is switched such as from the notebook computer mode to the tablet computer mode or is switched from the tablet computer mode to the notebook computer mode, an output signal of the switching sensor 400 for detecting the system mode can be switched. The micro controller 420 can continuously monitor the operating state of the switching sensor 400. A signal indicating a mode state detected by the switching sensor 400 can be sent to the system controller 440 through an interrupt operation. Information of the switched mode is stored (e.g., in the CMOS setup menu). The system controller 440 can manage the system according to the switched mode.

In accordance with embodiments of the present invention, the switching sensor 400 and the micro controller 420 can be configured to monitor a system mode switching operation. However, components for monitoring the system mode switching operation do not need to be limited to the switching sensor for monitoring a rotation operation of the display module 45 and the micro controller serving as the keyboard controller. Any sensor capable of detecting a system mode switching operation and any controller or component capable of confirming a value from the sensor can be used in place of the components.

Various software or firmware layers based upon a module or routine format containing application programs, operating system modules, device drivers, BIOS modules and interrupt handlers can be stored in at least one storage medium provided in the convertible computer system. The applicable storage media include hard disc drives, compact discs (CDs) or digital versatile discs (DVDs), floppy discs, nonvolatile memories and system memories. The modules, routines or other layers stored in the storage medium contain instructions for allowing the convertible computer system to execute programmed acts when executed.

The software or firmware layers can be loaded on the system by one of various methods. For example, code segments are stored in floppy discs, CD or DVD discs or hard discs, or code segments transported through a network interface card, modem or other interface devices can be loaded on the system and can be executed by a corresponding software or firmware layer. In the loading or transporting process, the code segments and data signals carried by a carrier (through a telephone line, a network line, a radio link, a cable, etc.) can be sent to the system.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments according to the present invention have various advantages. Embodiments of an apparatus and method for booting a system in a convertible computer can boot and operate the system by directly or automatically selecting a desired or an optimum operating system (OS) appropriate for a first (e.g., notebook computer mode) and a second (e.g., tablet computer mode) mode. Embodiments can further selectively use various functions and operations based upon the respective modes.

Embodiments of an apparatus and method for protecting at least one input unit in a convertible computer can reduce or prevent an erroneous operation of input units without additional instruments when a notebook computer mode and a tablet computer mode are used. Embodiments can reduce unnecessary power consumption by an input unit not used in a current system mode.

Embodiment can provide a protection circuit in a convertible computer that can reduce an erroneous operation of a system capable of being incurred while a switch detecting an open/closed state of a liquid crystal display (LCD) detects the closed state of the LCD in a tablet computer mode. Embodiments can reduce the erroneous operation of the system using a logic circuit without additional instruments to ensure a product's reliability and reduce manufacturing cost.

Embodiments of an apparatus and method for managing operating modes in a convertible system can perform a management operation appropriate for specifications based upon the operating modes, increase the utility and stability of the system, reduce unnecessary power consumption in a tablet computer mode rather than a notebook computer mode, individually or in combination.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A portable computer, comprising:
a portable computer device having a configuration that allows a system mode to be switched between a notebook computer mode and a tablet computer mode;
at least one input unit, wherein the input unit comprises a touch screen digitizer, a keyboard and at least one of a stick pointer and a touch pad;
a monitor configured to monitor a system mode switching operation;
a controller coupled to the monitor and configured to control an operating state of the input unit to be inactive according to a current system mode, wherein the controller controls the keyboard and said at least one of the stick pointer and the touch pad to be inactive and in a power OFF state when the current system mode is the tablet computer mode, and the controller controls the touch screen digitizer to be active and in a power ON state when the current system mode is the tablet computer mode, and wherein the controller controls the keyboard and said at least one of the stick pointer and the touch pad to be active and in the power ON state when the current system mode is the notebook computer mode, and the controller controls the touch screen digitizer to be inactive and in the power OFF state when the current system mode is the notebook computer mode.

2. An apparatus for protecting at least one input unit in a portable computer including a first input unit including a touch screen digitizer and a second input unit including at least one of a keyboard, a stick pointer and a touch pad and a portable computer device whose configuration state is configured to switch a system mode between a notebook computer mode and a tablet computer mode, the apparatus comprising:
monitoring means for monitoring a system mode switching operation; and
control means for controlling an operating state of the input units to be an inactivation state according to a current system mode, wherein the control means controls the keyboard and one of the stick pointer and the touch pad to be inactive and in a power OFF state when the current system mode is the tablet computer mode, and the control means controls the touch screen digitizer to be active and in a power ON state when the current system mode is the tablet computer mode, and wherein the control means controls the keyboard and one of the stick pointer and the touch pad to be active and in the power ON state when the current system mode is the notebook computer mode, and the control means controls the touch screen digitizer to be inactive and in the power OFF state when the current system mode is the notebook computer mode.

3. The apparatus of claim 2, wherein the portable computer device is a display module whose rotation state switches the current system mode between the notebook computer mode and the tablet computer mode.

4. A method for protecting at least one input unit in a portable computer including a display module whose rotation state allows a system mode to be switched between a notebook computer mode and a tablet computer mode, the input unit including a touch screen digitizer, and at least one of a keyboard, a stick pointer and a touch pad, the method comprising:
monitoring a system mode switching operation;
controlling an operating state of the input unit to be each of an active state and an inactive state according to a current system mode, wherein the controlling includes controlling the keyboard and said at least one of the stick pointer and the touch pad to be inactive and in a power OFF state when the current system mode is the tablet computer mode, and the controlling includes controlling the touch screen digitizer to be active and in a power ON state when the current system mode is the tablet computer mode, and wherein said controlling comprises controlling the keyboard, the stick pointer or the touch pad to be in the active state and to receive power when the current system mode is the notebook computer mode, and controlling the touch screen digitizer to be in the inactive state and to not receive power when the current system mode is the notebook computer mode.

5. An article including a machine-readable storage medium containing instructions for protecting a first input unit including a touch screen digitizer, and a second input unit selectively including at least one of a keyboard, a stick pointer and a touch pad in a portable computer including a display module whose rotation state allows a system mode to be switched between a notebook computer mode and a tablet computer mode, the instructions, when executed, causing the portable computer to:

monitor a system mode switching operation; and control an operating state of at least one input unit to be each of an activation state and inactivation state according to a current system mode, wherein the control of the operating state includes:

to control the second input unit to be in an active state and to be powered ON when the current system mode is the notebook computer mode, to control the first input unit to be in an inactive state and to be powered OFF when the current system mode is the notebook computer mode, to control the second input unit to be in the inactive state and to be powered OFF when the current system mode is the tablet computer mode, and to control the touch screen digitizer to be in the active state and to be powered ON when the current system mode is the tablet computer mode.

* * * * *